(12) United States Patent
Kim et al.

(10) Patent No.: US 9,341,770 B2
(45) Date of Patent: May 17, 2016

(54) THERMAL COMPENSATION COMPOSITION OF OPTICAL FIBER CONNECTOR CONTAINING A FIBER BRAGG GRATING

(75) Inventors: Byoung Whi Kim, Daejeon (KR); Mahn Yong Park, Seoul (KR); Gil Dong Lee, Chungcheongnam-do (KR); Geon Jeong, Daejeon (KR)

(73) Assignee: MEL TELECOM INC., Daejeon (KR)

( * ) Notice: Subject to any disclaimer, the term of this patent is extended or adjusted under 35 U.S.C. 154(b) by 410 days.

(21) Appl. No.: 13/695,761

(22) PCT Filed: Apr. 28, 2011

(86) PCT No.: PCT/KR2011/003149
§ 371 (c)(1),
(2), (4) Date: Nov. 1, 2012

(87) PCT Pub. No.: WO2011/139046
PCT Pub. Date: Nov. 10, 2011

(65) Prior Publication Data
US 2013/0044984 A1    Feb. 21, 2013

(30) Foreign Application Priority Data
May 1, 2010    (KR) .................. 10-2010-0041157

(51) Int. Cl.
*G02B 6/36*    (2006.01)
*G02B 6/02*    (2006.01)

(52) U.S. Cl.
CPC .................. *G02B 6/0218* (2013.01)

(58) Field of Classification Search
USPC ............................. 385/78, 12, 37
See application file for complete search history.

(56) References Cited

U.S. PATENT DOCUMENTS

| 4,932,263 | A | 6/1990 | Wlodarczyk et al. | |
| 6,310,997 | B1 * | 10/2001 | Kato et al. | 385/37 |

(Continued)

FOREIGN PATENT DOCUMENTS

| JP | 09-005561 | 1/1997 |
| WO | WO2008-020239 | 2/2008 |

*Primary Examiner* — Uyen Chau N Le
*Assistant Examiner* — Chad Smith
(74) *Attorney, Agent, or Firm* — IPLA P.A.; James E. Bame

(57) ABSTRACT

An optical fiber connector embedded with a Bragg grating includes: a ferrule formed with a reception unit for inserting and fixing a temperature compensation connection port from one end, a space unit extended from the reception unit toward inside, and an optical fiber insertion hole penetrating a side surface of the other end along a center of an axial direction from an inclined surface gradually narrowed toward inside of the space unit; the temperature compensation connection port formed with a connection unit contacting with the reception unit of the ferrule, an optical fiber support unit having an outer diameter smaller than an inner diameter of the space unit of the ferrule from the connection unit and protruding to be spaced apart from an inlet of the ferrule by a predetermined distance to form a space for accommodating the Bragg grating and support an optical fiber, and the optical fiber insertion hole penetrating both ends along the center of the axial direction to insert the optical fiber; an optical fiber cable having the optical fiber inserted into the optical fiber insertion hole of the temperature compensation connection port and the optical fiber insertion hole of the ferrule and the Bragg grating placed in the space unit of the ferrule; and a socket, one end of which is fixed to the ferrule, and the other end of which is fixed to an optical fiber cladding of the optical fiber cable.

13 Claims, 5 Drawing Sheets

(56) References Cited

U.S. PATENT DOCUMENTS 6,621,957 B1 * 9/2003 Sullivan et al. ............... 385/37
6,907,164 B2    6/2005 Lachance et al.
2007/0127538 A1 6/2007 Lee et al.

* cited by examiner (A)

(B)

(A)

(B)

(A)

(B)

THERMAL COMPENSATION COMPOSITION OF OPTICAL FIBER CONNECTOR CONTAINING A FIBER BRAGG GRATING

BACKGROUND OF THE INVENTION

The present invention relates to an optical fiber connector embedded with a Bragg grating, and more specifically, to an optical fiber connector embedded with a Bragg grating, in which an optical filer provided with the Bragg grating is used as an optical communication filter capable of selectively reflecting or transmitting light of a desired wavelength band and an optical sensor for finely measuring variation of pressure, stress and tension in a system for monitoring cracks, displacement, deformation and stability of a large-scale structure such as a bridge or a tunnel, and the optical fiber connector may show stable optical characteristics by compensating reflective wavelength characteristics of the Bragg grating shifted by the stress applied to the optical fiber grating from outside and changes in external environment such as increase of surrounding temperature.

An optical fiber Bragg grating is a device for inducing change in the refractive index of an optical fiber core to have a regular period in the longitudinal direction using a photo-induced refractive index modulation effect generated when ultraviolet rays are radiated into an optical fiber of a silica family containing impurities such as germanium (Ga) in the optical fiber core. It has a characteristic of selectively transmitting light of a specific wavelength band by reflecting light of a Bragg wavelength bandwidth satisfying Bragg reflection conditions and transmitting light of a wavelength which does not satisfy the Bragg reflection conditions.

In an example of manufacturing an optical fiber Bragg grating, an optical grating structure is formed inside the optical fiber core if two beams create a periodic pattern through an interference phenomenon. Alternatively, a predetermined area of an optical fiber is melted using a certain heat source, and an area of the optical fiber heated by the heat source is tensioned in order to change the effective refractive index that a mode propagating light through the optical fiber core experiences, and thus a Bragg grating having a regular period is formed in the tensioned area.

Such an optical fiber Bragg grating filter can be easily manufactured in commercial optical fibers, and optical connection is very easy since the size and transmission characteristics are the same as those of existing optical fibers. Therefore, the optical fiber Bragg grating filter is very widely used for optical communication filters and optical sensors.

It is general that a reflection or transmission bandwidth should be about 50% of a wavelength division multiplexing (WDM) channel space, and crosstalk should be at least 25 dB or higher to suppress interference with other channels if the Bragg grating is desired to be used as an add/drop filter (ADF), a WDM channel filter or the like in the WDM communication field, and it is general that the length of a Bragg grating filter satisfying the specification described above should be 1 Cm or longer.

Meanwhile, in a Bragg reflection filter for stabilizing the wavelength of a pump laser having a bandwidth of 980 nm, the maximum reflectivity should be less than 5% within the reflection bandwidth. In this case, the length of the Bragg grating filter is generally less than 5 mm.

In addition, a Bragg grating filter for measuring variation of pressure, stress and tension is generally required to have a reflectivity around 50% in order to measure shift in the center wavelength with respect to changes in external environment. The optical fiber Bragg grating filter is required to have various characteristics and sizes depending on application fields and installation positions as described above.

Bragg reflection characteristics of the optical fiber Bragg grating, i.e., optical characteristics, sensitively change depending on changes in surrounding environment of the optical fiber Bragg grating, specifically external environment such as temperature, humidity, vibration and the like. Particularly, the characteristics are greatly affected by changes in the stress applied to the Bragg grating, which is caused by the change in external environment such as temperature which is direct cause of deformation of the optical fiber and connector according to the characteristics of material.

It is since that, in the optical fiber, change of the refractive index is induced in the optical fiber core by the thermo-optic effect of an optical fiber material when external temperature is changed, and the Bragg grating period is also changed by the thermal expansion property of the optical fiber material itself, and thus the value of the Bragg reflective wavelength is shifted. In addition, when an external stress is applied to the Bragg grating or stress distribution is changed around the Bragg grating due to the change in external temperature, the refractive index of the optical fiber core is changed by the photoelastic effect, and the Bragg grating period is also changed by the stress, and thus the value of the Bragg reflective wavelength is shifted.

An example of the characteristic of the Bragg reflective wavelength shifted according to change in external temperature of the optical fiber Bragg grating and the stress applied to the Bragg grating due to the change in external temperature will be described with reference to FIGS. 1 and 2.

FIG. 1 is a view showing the structure of an optical fiber cable 1 formed with a general shape Bragg grating. As shown in the figure, the optical fiber cable 1 includes an optical fiber 11 formed with a Bragg grating 10, an optical fiber coating 12 formed of a polymer material for protecting the Bragg grating 10 and the optical fiber 11, and an optical fiber cladding 13 formed of a high molecular polymer material.

FIG. 2 is a view showing the internal structure of a conventional optical fiber connector according to an embodiment of the present invention, in which the optical fiber cable 1 formed with an optical fiber Bragg grating as shown in FIG. 1 is inserted into and fixed to a structure 2 having a ferrule 20 and a socket 21.

The ferrule 20 is formed with an inclined surface 200 which is gradually narrowed from the inlet toward inside in order to easily insert the optical fiber 11 from the side surface of one end, and an optical fiber insertion hole 201 penetrating the side surface of the other end along the center of the axial direction of the ferrule 20 is formed on the inclined surface 200.

The socket 21 is formed with an insertion hole 210 for inserting the optical fiber cable 1 and the ferrule 20 penetrating both ends of the socket, and an extended end unit 211 formed on the outer periphery of one end where the optical fiber coating 12 and the optical fiber cladding 13 are inserted.

In the structure described above, the optical fiber 11 formed with the Bragg grating 10 is inserted into the optical fiber insertion hole 201 through a space where the inclined surface 200 of the ferrule 20 is formed, and the Bragg grating 10 is placed inside the optical fiber insertion hole 201. The optical fiber cladding 13 and the ferrule 20 are inserted into the insertion hole 210 formed in the socket 21. While the optical fiber cladding 13 is placed at one end of the socket 21 and the ferrule 20 is placed at the other end where the extended end unit 211 is formed, the optical fiber cladding 13 is fixed to one end of the socket 21 by thermosetting resin 212.

While being placed in the optical fiber insertion hole 201 of the ferrule 20, the Bragg grating 10 is fixed by thermosetting resin 202.

FIG. 3 shows shift rates of the Bragg reflective wavelength ($\Delta\lambda/\Delta T$) measured when external temperature is changed from 0 to 60° C. in the structure of FIG. 2.

Generally, when stress is not applied from outside, the shift rate of an optical fiber Bragg grating according to thermo-optic effect is 10 µm/deg. However, the measured shift rates are in a range of about 20 to 30 µm/deg although there is a difference according to temperature, and this is two or three times larger than the shift rate induced by the thermo-optic effect.

Observing the reflection spectra of the Bragg grating measured at external environment temperatures of 25 and 30° C. as shown in FIG. 3A, if surrounding temperature changes by 25° C., the Bragg center wavelength shifts to a wavelength of about 600 µm. This is caused by the fact that, other than the thermo-optic effect, when temperature of external environment is changed, stress is applied to the optical fiber Bragg grating due to the difference in thermal expansion coefficients of the materials surrounding the Bragg grating, and the grating period is changed thereby, and thus optical characteristics are changed.

A variety of methods have been proposed to reduce changes in the optical characteristics affected by dependency of the optical fiber Bragg grating on temperature change of external environment and stress.

Referring to the structure applied by William W. Morey et al. (Incorporated Bragg filter temperature compensated optical waveguide device, U.S. Pat. No. 5,042,898), proposed are a principle and a structure for making the Bragg reflective wavelength be independent from the temperature change of external environment by offsetting changes in the refractive index caused by the thermo-optic effect of a silica optical fiber with a variation rate of the optical fiber grating period caused by difference in thermal expansion coefficients, using heterogeneous materials having different thermal expansion coefficients, and a temperature compensation connection port is proposed as an embodiment thereof.

Referring to a paper issued by G. W. Yoffe et al. in Applied Optics, vol. 34, Issue 30, pp. 6859-6861, 1995, a structure has been manufactured using aluminum and silica based on the principle proposed by Morey as a temperature compensation connection port, and it is announced as a result that the degree of Bragg wavelength shift is reduced as much as 0.07 nm when the environment temperature varies from −30 to 70° C.

In addition, the structure applied by R. L. Lachance et al. (Adjustable athermal package for optical fiber devices, U.S. Pat. No. 6,907,164) also has proposed a temperature compensation structure of an optical fiber Bragg grating based on the principle proposed by Morey and presented a test result showing that the degree of Bragg wavelength shift is 0.1 nm when the temperature varies from −40 to 80° C.

In the cases described above, both of the structures offset the thermo-optic effect of the optical fiber Bragg grating by structurally combining heterogeneous materials having different thermal expansion coefficients. The principles are the same, and the proposed structures are different only in implementation methods.

FIG. 4 shows the configuration of a temperature compensation structure for illustrating the principle of compensating the optical fiber Bragg wavelength proposed in the documents described above. Referring to the figure, a structure formed of a material having a small thermal expansion coefficient and a temperature compensation connection port 31 formed of a material having a large thermal expansion coefficient are fixed to each other using thermosetting resin 32 or other mechanical method. The Bragg grating 10 of the optical cable 11 is inserted through the inner hole, and the optical cable 11 is fixed to the structure 30 and the temperature compensation connection port 31 using thermosetting resin 33 and 34. The temperature compensation connection port 31 is formed with an optical fiber support unit 310 protruded so as to be freely expanded or contracted by the change in external temperature without being interfered by the structure 30.

Here, the structure 30 is the ferrule 20 of a zirconia material or a composite structure including the ferrule 20 and the socket 21 of a metallic material as shown in FIG. 2, and its thermal expansion coefficient is $\alpha 1$. The thermal expansion coefficient of the temperature compensation connection port 31 is $\alpha 2$, and the effective thermal expansion coefficient of the Bragg grating 10 area according to the change in temperature of external environment is $\alpha$. In order to compensate the temperature of the Bragg grating, $\alpha 2$ should be larger than $\alpha 1$.

When L1 is the distance between the position where the structure 30 and the temperature compensation connection port 31 are fixed to each other by the thermosetting resin 32 and the position where the optical fiber 11 is fixed to the structure 30 by the thermosetting resin 33, and L$\alpha$ is the length of the Bragg grating 101 that is to be temperature-compensated, the mathematical expression shown below expresses the relation of $\alpha$ values and L1 and L2 for compensating temperature of the Bragg grating 10.

$$\alpha = (\alpha 1 \times L1 - \alpha 2 \times L2)/(L1 - L2) \sim -9 \times 10^{-6} \ [1/\text{deg}]$$

Mathematical Expression 1

A variety of structures for compensating temperature of the Bragg grating can be derived from the mathematical expression. For example, the principle of mathematical expression 1 is applied to the structures proposed by Yoffe and Lachance. In an embodiment, a cylindrical housing and a temperature compensation connection port are formed using a metallic material such as silica, aluminum or the like and other fixing resin materials, and a bidirectional optical fiber pigtail is included to input and output light.

In FIG. 4, a material of the temperature compensation connection port 31 and a length of the protruded part 310 can be determined using mathematical expression 1. Accordingly, a value of L2, which is the length of the protruded part 310 of the temperature compensation connection port 31 with respect to length L1 of the structure 30, can be calculated using mathematical expression 1 based on Table 1 which summarizes thermal expansion coefficient values of available materials.

Thermal expansion coefficients of various materials that can be used for the structure 30 are shown in Table 1.

TABLE 1

| Material | CTE[$10^{-6}$/deg] |
|---|---|
| Aluminum (Al) | 23 |
| Brass | 19 |
| SUS304 | 17 |
| Acetal (POM) | 100~150 |
| Polycarbonate (PC) | 60~70 |
| Polyimide | 55 |
| Zirconia | 10 |

For example, when the material of the structure 30 is zirconia and the material of the temperature compensation connection port 31 is aluminum and brass in FIG. 4, a result of calculating values of structural variables L2, L1 and L$\alpha$ defined in FIG. 4 is summarized in Table 2 shown below.

TABLE 2

| Zirconia/Brass | | | Zirconia/Aluminum | | |
|---|---|---|---|---|---|
| L2 (mm) | L1 (mm) | Lα (mm) | L2 (mm) | L1 (mm) | Lα (mm) |
| 0.5 | 0.84 | 0.34 | 0.5 | 0.74 | 0.24 |
| 1 | 1.68 | 0.68 | 1 | 1.47 | 0.47 |
| 1.5 | 2.52 | 10.2 | 1.5 | 2.21 | 0.71 |
| 2 | 3.36 | 0.36 | 2 | 2.94 | 0.94 |
| 2.5 | 4.20 | 1.70 | 2.5 | 3.68 | 1.18 |
| 3 | 5.04 | 2.04 | 3 | 4.41 | 1.41 |
| 3.5 | 5.88 | 2.38 | 3.5 | 5.15 | 1.68 |
| 4 | 6.72 | 2.72 | 4 | 5.88 | 1.88 |
| 4.5 | 7.56 | 3.06 | 4.5 | 6.62 | 2.12 |
| 5 | 8.40 | 3.40 | 5 | 7.36 | 2.36 |
| 5.5 | 9.24 | 3.74 | 5.5 | 8.09 | 2.59 |
| 6 | 10.08 | 4.08 | 6 | 8.83 | 2.83 |
| 6.5 | 10.92 | 4.42 | 6.5 | 9.56 | 3.06 |
| 7 | 11.76 | 4.76 | 7 | 10.36 | 3.30 |
| 7.5 | 12.60 | 5.10 | 7.5 | 11.03 | 3.53 |
| 8 | 13.45 | 5.45 | 8 | 11.77 | 3.77 |
| 8.5 | 14.29 | 5.79 | 8.5 | 12.51 | 4.01 |
| 9 | 15.13 | 6.13 | 9 | 13.24 | 4.24 |
| 9.5 | 15.97 | 6.47 | 9.5 | 13.98 | 4.48 |
| 10 | 16.81 | 6.81 | 10 | 14.71 | 4.71 |

In Table 2, a range of L2 values is determined as 0 to 5 mm considering the length of the ferrule in an optical fiber connector of an LC or MU type. In the case of an optical fiber connector ferrule of an SC or FC type, the range of L2 values can be as wide as 0 to 10 mm.

Here, Lα denotes the actual length of the optical fiber Bragg grating and has a value of L1-L2.

SUMMARY OF THE INVENTION

A ferrule in a standard optical fiber connector is generally manufactured using zirconia, and an optical fiber inserted into the zirconia ferrule needs an additional structure which can apply a tension force or a compressive force to a Bragg grating depending on temperature change in order to compensate the Bragg grating period changed depending on changes in temperature of external environment.

Therefore, the present invention has been made in view of the above problems, and it is an object of the present invention to provide an optical fiber connector embedded with a Bragg grating, in which the optical fiber Bragg grating is embedded inside a standard optical fiber connector structure such as LC, SC, MU, FC or the like, and shift in the center wavelength of the Bragg grating is compensated against temperature change of external environment.

To accomplish the above object, according to one aspect of the present invention, there is provided a ferrule including an optical fiber insertion hole penetrating the side surface of the other end along the center of the axial direction from an inclined surface formed to be gradually narrowed from the inlet toward inside in order to easily insert an optical fiber from the side surface of one end, a socket including an insertion hole formed to penetrate both ends of the socket along the center of the axial direction and insert the ferrule and the optical fiber cable having a Bragg grating, and an optical fiber connector for inserting a temperature compensation connection port for compensating shift in a reflection center wavelength of the Bragg grating of the optical fiber cable. The optical fiber connector includes: a ferrule formed with a reception unit for inserting and fixing a temperature compensation connection port from one end, a space unit extended from the reception unit toward inside, and an optical fiber insertion hole penetrating a side surface of the other end along a center of an axial direction from an inclined surface gradually narrowed toward inside of the space unit; the temperature compensation connection port formed with a connection unit contacting with the reception unit of the ferrule, an optical fiber support unit having an outer diameter smaller than an inner diameter of the space unit of the ferrule from the connection unit and protruding to be spaced apart from an inlet of the ferrule by a predetermined distance to form a space for accommodating the Bragg grating and support an optical fiber, and the optical fiber insertion hole penetrating both ends along the center of the axial direction to insert the optical fiber; an optical fiber cable having the optical fiber inserted into the optical fiber insertion hole of the temperature compensation connection port and the optical fiber insertion hole of the ferrule and the Bragg grating placed in the space unit of the ferrule; and a socket, one end of which is fixed to the ferrule, and the other end of which is fixed to an optical fiber cladding of the optical fiber cable.

According to another aspect of the present invention, there is provided an optical fiber connector including a temperature compensation connection port for compensating shift in a reflection center wavelength of a Bragg grating of an optical fiber cable formed with the Bragg grating, the optical fiber connector comprising: a ferrule formed with a reception unit for inserting and fixing a temperature compensation connection port from one end, a space unit extended from the reception unit toward inside, and an optical fiber insertion hole penetrating a side surface of the other end along a center of an axial direction from an inclined surface gradually narrowed toward inside of the space unit; the temperature compensation connection port formed with a connection unit contacting with the reception unit of the ferrule, an optical fiber support unit having an outer diameter smaller than an inner diameter of the space unit of the ferrule from the connection unit and protruding to be spaced apart from an inlet of the ferrule by a predetermined distance to form a space for accommodating the Bragg grating, and an optical fiber insertion hole penetrating both ends along the center of the axial direction to insert the optical fiber; an optical fiber cable having the optical fiber inserted into the optical fiber insertion hole of the temperature compensation connection port and the optical fiber insertion hole of the ferrule and the Bragg grating placed in the space unit of the ferrule; and a socket, one end of which is fixed to the ferrule, and the other end of which is fixed to an optical fiber cladding of the optical fiber cable.

According to still another aspect of the present invention, there is provided an optical fiber connector including a temperature compensation connection port for compensating shift in a reflection center wavelength of a Bragg grating of an optical fiber cable formed with the Bragg grating, the optical fiber connector comprising: a ferrule formed with a space unit for inserting an optical fiber from one end and an optical fiber insertion hole penetrating a side surface of the other end along a center of an axial direction from an inclined surface gradually narrowed toward inside of the space unit; a socket one end of which is fixed to the ferrule; a temperature compensation connection port formed with an optical fiber support unit having an outer diameter smaller than an inner diameter of an insertion hole formed in the socket and protruding to be spaced apart from an inlet of the ferrule by a predetermined distance to form a space for accommodating the Bragg grating, and an optical fiber insertion hole penetrating both ends along the center of the axial direction to insert the optical fiber; and an optical fiber cable having the optical fiber inserted into the optical fiber insertion hole of the temperature compensation connection port and the optical fiber insertion hole of the ferrule and the Bragg grating placed in the space unit of the ferrule.

The appearance of the ferrule and the socket is the same as or compatible to that of a standard optical connector of an LC, MU, SC or FC type. In a general optical fiber, the length of the Bragg grating is less than 10 mm, and the length of a protruded portion of the optical fiber support unit of the temperature compensation connection port is 1.5 to 8.5 mm.

Such a ferrule is formed of a zirconia material, and the reception unit and the space unit may be formed to have an inner periphery of the same diameter. Alternatively, the reception unit may be formed to have an inner periphery of a diameter larger than a diameter of the space unit to accommodate the connection unit of the temperature compensation connection port. The reception unit may form a space having an inclined surface gradually narrowed from the inlet toward inside, and the connection unit of the temperature compensation connection port may form an inclined surface contacting with the inclined surface of the reception unit which forms the space gradually narrowed toward the inside.

In addition, the outer diameter of the optical fiber support unit of the temperature compensation connection port may be formed to have a cross section inclined to be gradually narrowed from the connection unit, or the optical fiber support unit of the temperature compensation connection port may be formed to have at least two or more steps.

In the present invention described above, the temperature compensation connection port formed of the materials shown in Table 1 for compensating temperature of the Bragg grating (period) is placed inside or in the neighborhood of the metallic socket surrounding the ferrule and fixed to the ferrule and the socket. In the optical fiber cable, a segment of the optical fiber without the Bragg grating is inserted into the optical fiber insertion hole of the temperature compensation connection port and the optical fiber insertion hole of the ferrule and fixed by thermosetting resin, and a segment of the optical fiber inscribed with the Bragg grating is placed in the space unit of the ferrule without being interfered by the temperature compensation connection port and the ferrule, and thus the optical fiber does not contact with the thermosetting resin. Therefore, the present invention prevents change of the Bragg grating period to the maximum against the stress caused by temperature change and external load.

An optical fiber connector for compensating temperature of an optical fiber Bragg grating of the present invention can be manufactured in the form of a standard optical fiber connector of a variety of forms such as standard LC, MU, SC and FC embedded with the Bragg grating, using a ferrule embedded with the Bragg grating, a temperature compensation connection port, a socket surrounding the ferrule and commercialized optical fiber connector accessories, and thus an optical fiber can be easily connected to other optical components using an optical fiber adapter without the need of a housing and a pigtail separately.

DESCRIPTION OF SYMBOLS

| | |
|---|---|
| 1, 1a: Optical fiber cable | 5: Optical fiber connector |
| 10, 10a: Bragg grating | 11, 11a: Optical fiber |
| 12, 12a: Optical fiber coating | |
| 13: Optical fiber cladding | 50, 50a: Ferrule |
| 51, 51a: Temperature compensation connection port | |
| 52, 52a: Socket | 60, 60a: Thermosetting resin |
| 500: Reception unit | 501, 501a: Space unit |
| 502, 502a: Inclined surface | |
| 503, 503a: Optical fiber insertion hole | |
| 504: End surface | 506: Inclined surface |
| 510, 510a: Optical fiber insertion hole | |
| 511, 511a: Inclined surface | 512: Connection unit |
| 513, 513a, 513', 513a': Optical fiber support unit | |
| 514: Optical cable insertion depression | |
| 515: Inclined surface | 520: Insertion hole |
| 521, 521a: Extended end unit | 524: Inclined surface |

DETAILED DESCRIPTION OF THE INVENTION

Advantages and features of the present invention will be clarified through following embodiments described with reference to the accompanying drawings.

The preferred embodiments of the present invention will be hereafter described.

Figure 1:
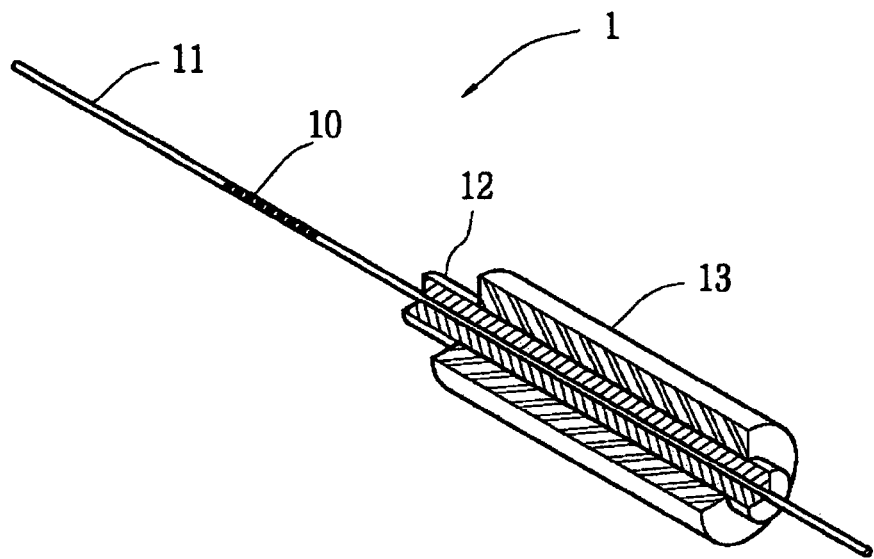
FIG. 1 is an exploded perspective view showing a segment of an optical fiber cable formed with an optical fiber Bragg grating.
Figure 2:
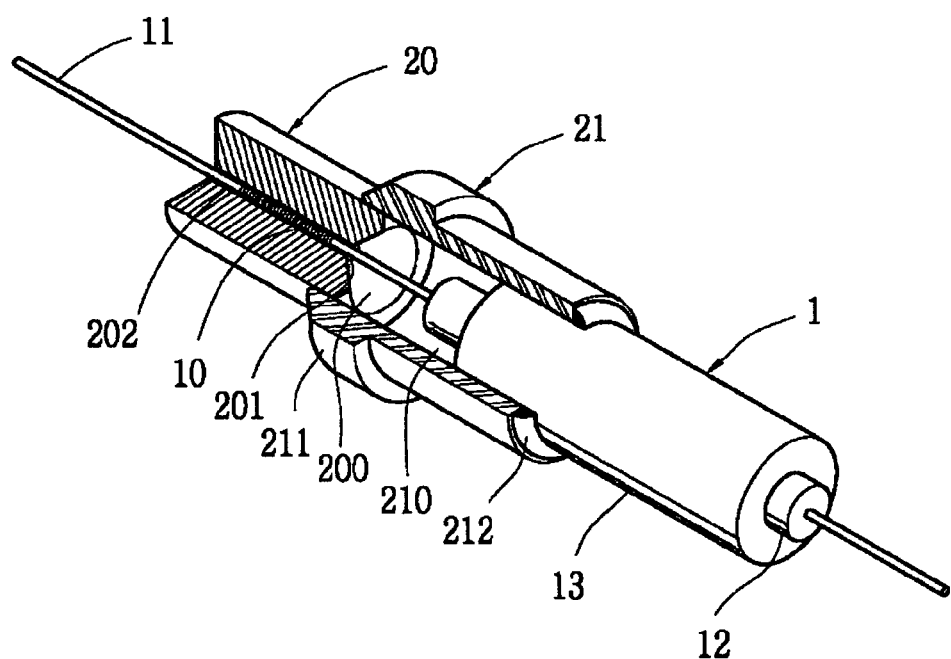
FIG. 2 is an exploded perspective view showing a portion of a conventional optical fiber connector embedded with an optical fiber Bragg grating.
Figure 3:
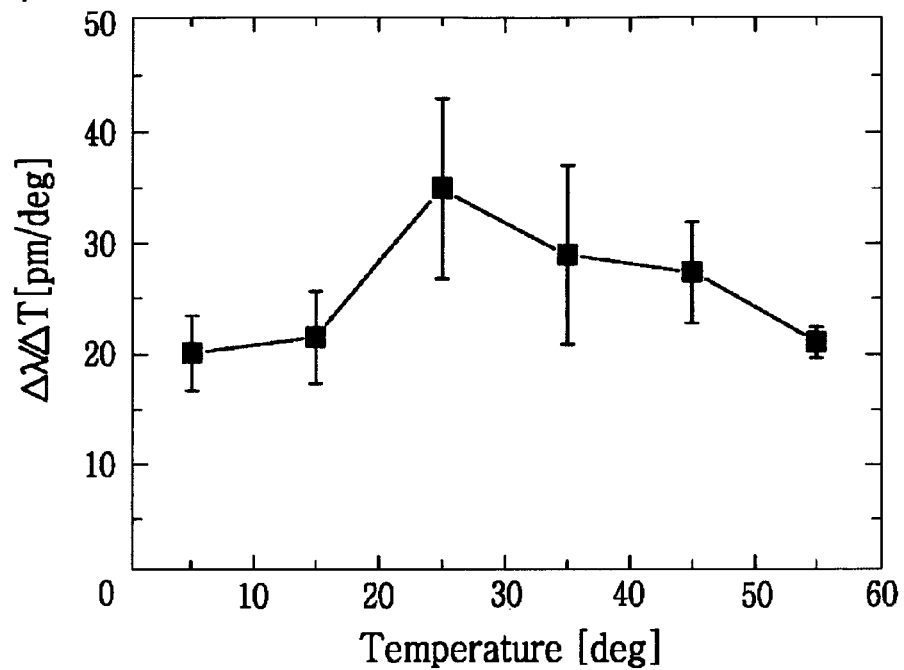
FIG. 3A is a graph showing shift rates of a Bragg reflective wavelength according to changes in temperature measured in a conventional optical fiber connector.
FIG. 3B is a graph showing Bragg reflective spectra according to changes in temperature measured in a conventional optical fiber connector.
Figure 3:
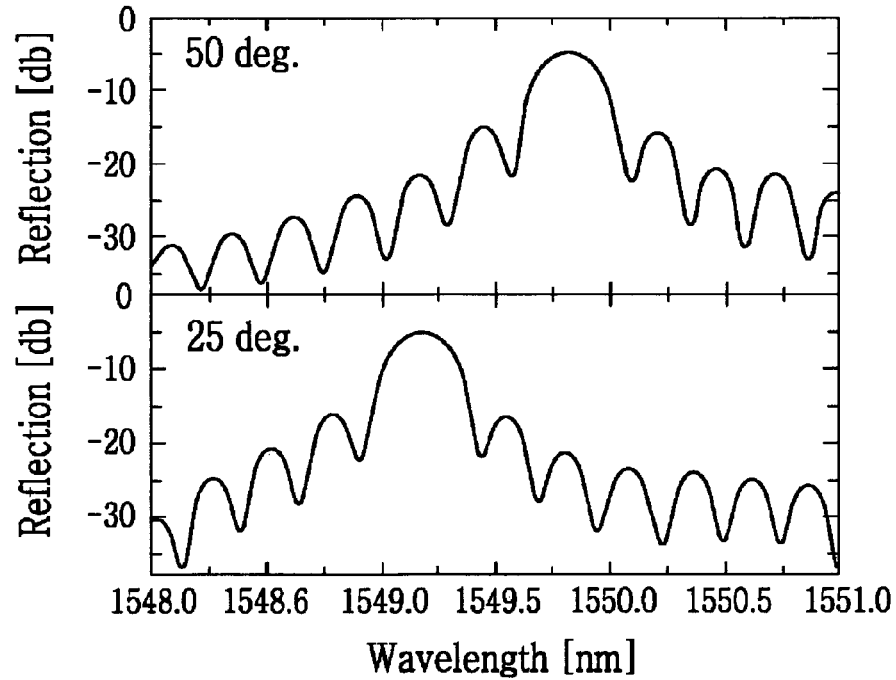
Figure 4:
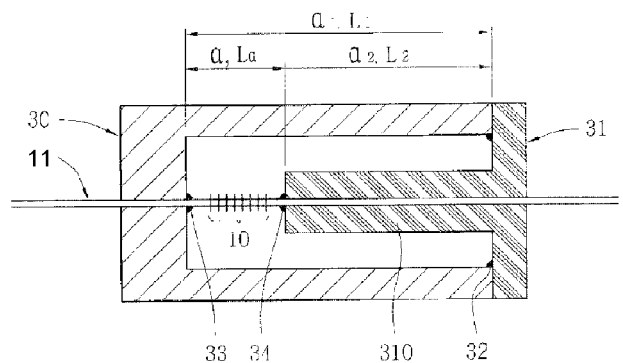
FIG. 4 is a cross-sectional view showing a structure for describing a principle of compensating an optical fiber Bragg wavelength.
Figure 5:
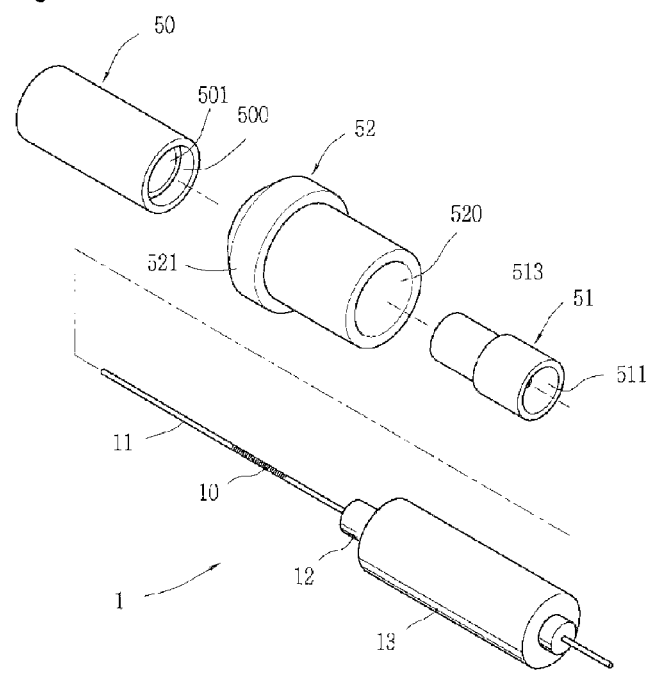
FIG. 5 is an exploded perspective view showing the internal structure of an optical fiber connector embedded with an optical fiber Bragg grating according to an embodiment of the present invention.
Figure 6:
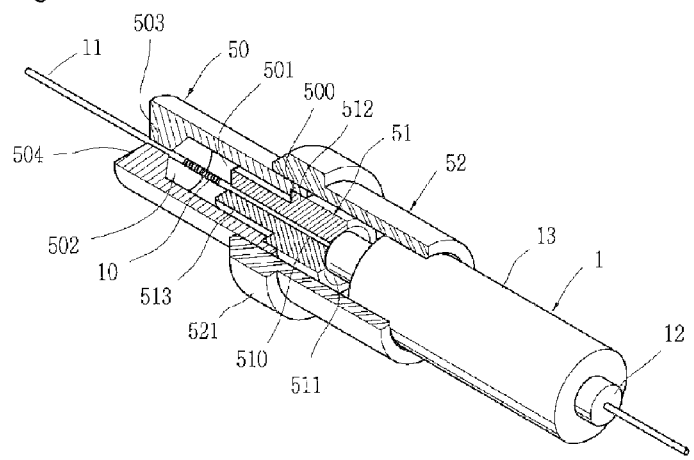
FIG. 6 is a partially exploded perspective view showing an assembled optical fiber connector of the present invention.

FIG. 5 is an exploded perspective view showing the internal structure of an optical fiber connector embedded with an optical fiber Bragg grating according to an embodiment of the present invention, and FIG. 6 is a view showing an assembled state of the constitutional components of FIG. 5.

As is known to the public, an optical fiber cable 1 includes an optical fiber 11 formed with a Bragg grating 10, an optical fiber coating 12 formed of a polymer material for protecting the Bragg grating 10 and the optical fiber 11, and an optical fiber cladding 13 formed of a high molecular polymer material.

An optical fiber connector 5 of the present invention includes a ferrule 50, a temperature compensation connection port 51 and a socket 52.

The ferrule 50 is formed of a zirconia material, and a reception unit 500 is formed as a cylindrical space from one end so that the temperature compensation connection port 51 is inserted and fixed together with the optical fiber 11.

A cylindrical space unit 501 for inserting the temperature compensation connection port 51 without interference is formed inside the reception unit 500. The space unit 501 having an inner diameter smaller than that of the reception unit 500 forms a step and is extended toward inside.

A cone-shaped inclined surface 502 having a cross section gradually narrowed toward inside to easily insert the optical fiber 11 is formed inside the space unit 501 to guide one end of the inserted optical fiber, and an optical fiber insertion hole 503 penetrating along the center of the axial direction of the ferrule 50 to the center of the side surface of the other end is formed to insert and fix the optical fiber 11 inserted through the reception unit 500.

Although the end surface 504 of the ferrule 50 where the optical fiber insertion hole 503 is perforated is shown in the form of a physical contact (PC), it can be manufactured in various methods such as ultra physical contact (UPC) and angled physical contact (APC).

The temperature compensation connection port 51 is manufactured using the materials arranged in Table 1 such as aluminum or brass. An optical fiber insertion hole 510 penetrating along the center of the axial direction is perforated so that the optical fiber 11 may be inserted, and a cone-shaped inclined surface 511 having a cross section gradually narrowed toward inside is formed on the side surface of one end so that the optical fiber 11 may be easily guided and inserted.

In addition, a cylindrical connection unit 512 having a predetermined outer diameter and contacting with the reception unit 500 of the ferrule 50 is formed from one end, and a step is formed from the connection unit 512 to form an optical fiber support unit 513 having an outer diameter smaller than the inner diameter of the space unit 501 of the ferrule 50 and protruding but keeping a predetermined distance apart from the optical fiber insertion hole 503 of the ferrule 50 to form a space for accommodating the Bragg grating 10.

The socket 52 is preferably manufactured using stainless steel. An insertion hole 520 is formed to insert the optical fiber cable 1 and the ferrule 50 penetrating both ends of the socket 52, and an extended end unit 521 is formed on the outer periphery of one end of the socket where the ferrule 50 is inserted.

In the present invention configured as described above, first, the optical fiber 11 of the optical fiber cable 1 is guided from one end of the temperature compensation connection port 51 where the inclined surface 511 is formed to the inclined surface 511 and inserted into the optical fiber insertion hole 510 until the optical fiber coating 12 contacts with the inclined surface 511.

At this point, the Bragg grating 10 comes out of the optical fiber insertion hole 510 of the temperature compensation connection port 51 when the optical fiber coating 12 contacts with the inclined surface 511.

The optical fiber 11 inserted into the optical fiber insertion hole 510 as described above is fixed to the temperature compensation connection port 51 by thermosetting resin 60 injected into the optical fiber insertion hole 510, and the optical fiber coating 12 contacting with the inclined surface 511 is fixed to the temperature compensation connection port 51 by thermosetting resin 61.

Meanwhile, the optical fiber 11 inserted into and coming out of the optical fiber insertion hole 510 of the temperature compensation connection port 51 is guided to the inclined surface 502 from the space unit 501 of the ferrule 50, inserted into the optical fiber insertion hole 503, and withdrawn from the optical fiber connector.

At the same time, when the temperature compensation connection port 51 is inserted into the space unit 501 of the ferrule 50, the connection unit 512 is inserted into the reception unit 500 forming the space unit 501 and the step, and the optical fiber support unit 513 is placed in the space unit 501 inside the ferrule 50.

Then, the optical fiber cladding 13 and the ferrule 50 are inserted into the insertion hole 520 formed in the socket 52. The optical fiber cladding 13 is inserted into one end of the socket 52 and fixed by thermosetting resin 64, and the ferrule 50 is press-fitted to the other end where the extended end unit 521 is formed.

In the optical fiber cable 1 of the present invention described above, a segment of the optical fiber without the Bragg grating 10 is inserted into the optical fiber insertion hole 510 of the temperature compensation connection port 51 and the optical fiber insertion hole 503 of the ferrule 50 and fixed by thermosetting resin, and a segment of the optical fiber inscribed with the Bragg grating 10 is placed in the space unit 501 of the ferrule 50 without being interfered by the ferrule 50 and the temperature compensation connection port 51, and thus the Bragg grating 10 period may keep a stable state against temperature change and external force.

Figure 7:
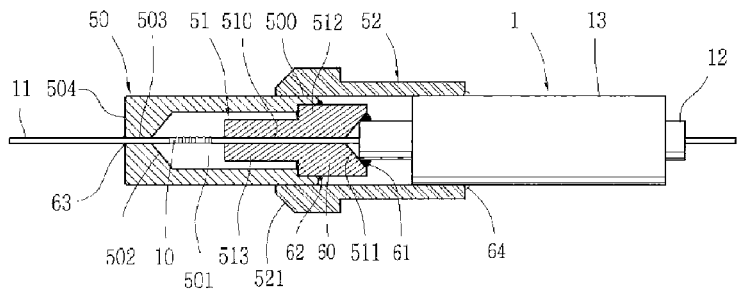
FIG. 7A is a cross-sectional view showing an optical fiber connector according to an embodiment of the present invention.
FIG. 7B is a view showing an example of design variables according to an embodiment of the present invention.
Figure 7:
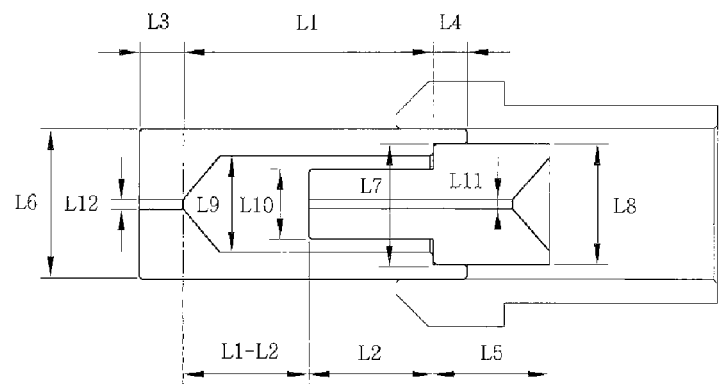

In an embodiment of the structure shown in FIG. 7, a range of values of the structure design variables L1 to L12 shown in FIG. 7(└┤) permitted in the case where an optical fiber Bragg grating having a diameter of 125 μm is inserted into an optical fiber connector ferrule of a commercial LC or MU type having a length of 6.5 mm and a diameter of 1.25 mm, and representative values of the structure variables used in the case where zirconia is used as a material of the ferrule 50 and brass and aluminum are used as a material of the temperature compensation connection port 51 in an example of an actual design are summarized in Table 3.

TABLE 3

Unit: mm

| Variable | Range | Representative value (zirconia/brass) | Representative value (zirconia/aluminum) |
|---|---|---|---|
| L1 | 2.5~5.0 | 4.5 | 4.5 |
| L2 | 1.5~5.0 | 3.0 | 2.7 |
| L3 | 0.5~2.0 | 1.0 | 1.0 |
| L4 | 0.5~3.0 | 1.0 | 1.0 |
| L5 | 2.0~6.0 | 3.0 | 3.0 |
| L6 | 1.25 | 1.25 | 1.25 |
| L7 | 0.6~1.1 | 0.8 | 0.8 |
| L8 | 0.5~1.0 | 0.7 | 0.7 |
| L9 | 0.6~1.1 | 0.6 | 0.6 |
| L10 | 0.3~1.0 | 0.4 | 0.4 |
| L11 | 0.2~0.6 | 0.25 | 0.25 |
| L12 | 0.125~0.25 | 0.125 | 0.125 |

When a metallic material for compensating temperature is changed from aluminum to brass, a difference of L2 is made in the length for temperature compensation by the difference in the thermal expansion coefficient values summarized in Table 1.

Meanwhile, in another embodiment of the structure shown in FIG. 7, a range of values of the structure design variables L1 to L12 shown in FIG. 7(└┤) permitted in the case where an optical fiber Bragg grating is inserted into an optical fiber connector ferrule of a commercial SC or FC type having a length of 10.5 mm and a diameter of 2.5 mm, and representative values of the structure variables used in the case where zirconia is used as a material of the ferrule 50 and brass and aluminum are used as a material of the temperature compensation connection port 51 are summarized in Table 4.

TABLE 4

Unit: mm

| Variable | Range | Representative value (zirconia/brass) | Representative value (zirconia/aluminum) |
|---|---|---|---|
| L1 | 2.5~8.5 | 7.5 | 7.5 |
| L2 | 1.5~8.5 | 4.5 | 5.0 |
| L3 | 0.5~8.5 | 1.5 | 1.5 |
| L4 | 0.5~8.5 | 1.5 | 1.5 |
| L5 | 2.0~8.0 | 3.0 | 3.0 |
| L6 | 2.5 | 2.50 | 2.20 |
| L7 | 0.6~2.3 | 2.0 | 2.0 |
| L8 | 0.5~2.2 | 1.8 | 1.8 |
| L9 | 0.6~2.1 | 1.6 | 1.6 |
| L10 | 0.3~2.0 | 1.4 | 1.4 |
| L11 | 0.2~0.6 | 0.25 | 0.25 |
| L12 | 0.125~0.25 | 0.125 | 0.125 |

The structure of the temperature compensation connection port 51 proposed in the present invention and the range of the design variable values L1 to L12 arranged in Tables 3 and 4 can be changed diversely.

In addition, the representative values of the design variables arranged in Tables 3 and 4 are for describing the purpose of the structure proposed in the present invention, not for limiting values of the design variables, and various representative values can be derived under the condition satisfying the range of values of the proposed design variables L1 to L12.

Figure 8:
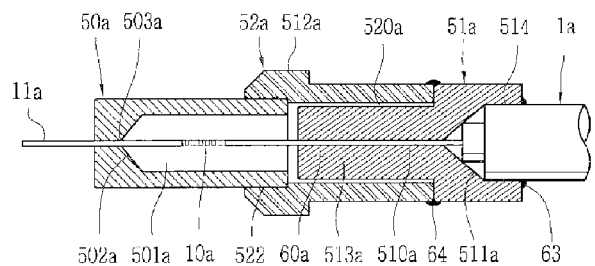
FIG. 8A is a cross-sectional view showing an optical fiber connector according to another embodiment of the present invention.
FIG. 8B is a view showing an example of design variables according to another embodiment of the present invention.
Figure 8:
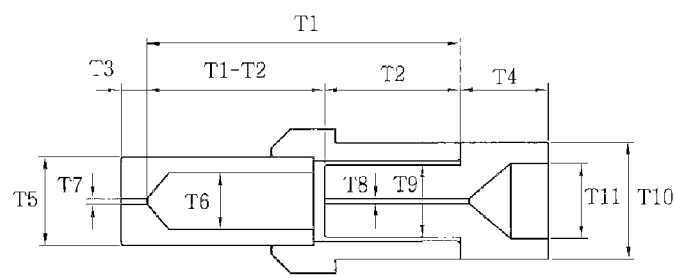

FIG. 8 is a cross-sectional view showing an optical fiber connector for compensating temperature of an optical fiber Bragg grating according to another embodiment of the present invention.

A ferrule 50a includes a space unit 501a formed as a cylindrical space from one end to receive an optical fiber 11a. A cone-shaped inclined surface 502a having a cross section gradually narrowed toward inside to easily insert the optical fiber 11a is formed inside the space unit 501a to guide one end of the inserted optical fiber 11a, and an optical fiber insertion hole 503a penetrating along the center of the axial direction of the ferrule 50 to the center of the side surface of the other end is formed to insert and fix the optical fiber 11a inserted through the space unit 501a.

In a temperature compensation connection port 51a, an optical fiber insertion hole 510a penetrating along the center of the axial direction is perforated so that the optical fiber 11a may be inserted, and a cone-shaped inclined surface 511a having a cross section gradually narrowed toward inside from an optical cable insertion depression 514 of a cylindrical shape is formed on the side surface of one end so that an optical fiber cable la and the optical fiber 11a may be easily guided and inserted.

In addition, a step is formed from the outer periphery where the optical cable insertion depression 514 is formed, and an optical fiber support unit 513a having an outer diameter smaller than the inner diameter of the socket 52a and forming a space for accommodating the Bragg grating 10a is formed at a predetermined distance apart from the inlet of the ferrule 50a where the optical fiber 11a is inserted.

The socket 52a includes an insertion hole 520a formed to insert the ferrule 50 and the temperature compensation connection port 51a penetrating both ends of the socket 52a. A reception unit 522 having an inner periphery wider than the insertion hole 520a is formed at one end where the ferrule 50a is inserted, and an extended end unit 521a is formed on the outer periphery of the socket.

In the embodiment configured as described above, after one end of the ferrule 50a is press-fitted to the reception unit 522 of the socket 52a, if the optical fiber 11a of the optical fiber cable 1a is guided from one end of the temperature compensation connection port 51a where the optical cable insertion depression 514 is formed to the inclined surface 511a and inserted into the optical fiber insertion hole 510a until the optical fiber coating 12a contacts with the inclined surface 511a, the Bragg grating 10a comes out of the optical fiber insertion hole 510a of the temperature compensation connection port 51a, and the front end of the optical fiber cable 1a is inserted into the optical cable insertion depression 514 formed at the temperature compensation connection port 51a.

The optical fiber 11a inserted into the optical fiber insertion hole 510a as described above is fixed to the temperature compensation connection port 51a by thermosetting resin 60a injected into the optical fiber insertion hole 510a, and the optical fiber cable 1a inserted into the optical cable insertion depression 514 is fixed to the temperature compensation connection port 51a by thermosetting resin 63.

Meanwhile, the optical fiber 11a inserted into and coming out of the optical fiber insertion hole 510a of the temperature compensation connection port 51a is inserted into the optical fiber insertion hole 503a from the space unit 501a of the ferrule 50a through a space where the inclined surface 502a is formed, and withdrawn from the optical fiber connector.

At the same time, when the optical fiber support unit 513a is inserted into the socket 52a, one end on the side surface of the temperature compensation connection port 51a contacts with and fixed to the side surface of the socket 52a using thermosetting resin 64.

Accordingly, in the optical fiber cable 1a, a segment of the optical fiber without the Bragg grating 10a is inserted into the optical fiber insertion hole 510a of the temperature compensation connection port 51a and the optical fiber insertion hole 503a of the ferrule 50a and fixed by thermosetting resin, and a segment of the optical fiber inscribed with the Bragg grating 10a is placed in the space unit 501a of the ferrule 50a without being interfered by the ferrule 50a and the temperature compensation connection port 51a, and thus the Bragg grating 10a period may keep a stable state against temperature change and external force.

Since the temperature compensation connection port 51a is protruded out of the socket 52a, the temperature compensation structure of the Bragg grating shown in FIG. 8 is not the same in appearance as the structure of the embodiment described above.

Although the thermal expansion coefficients of the ferrule 50 formed of a zirconia material are considered in the structure shown in FIG. 7, the structure of FIG. 8 should compensate Bragg grating temperature considering the thermal expansion coefficients of all components including the ferrule 50a of a zirconia material and the socket 52a of a metallic material.

According to Table 1 shown above, since the thermal expansion coefficient of the SUS430 material is the same as the thermal expansion coefficient of the zirconia, if the SUS430 is selected as a material of the metallic socket 52, only temperature needs to be compensated simply considering a sum of the length of the ferrule 50 formed of the zirconia and the length of the socket 52 formed of the SUS430. However, when another metallic material is used, the length for compensating temperature should be designed considering thermal expansion coefficient of the material.

In an embodiment of the structure shown in FIG. 8, a range of values of the structure design variables shown in FIG. 8B permitted in the case where an optical fiber Bragg grating having a diameter of 125 μm is inserted into an optical fiber connector ferrule of a commercial LC or MU type having a length of 6.5 mm and a diameter of 1.25 mm, and representative values T1 to T12 of structure variables used in the case where zirconia is used as a material of the ferrule 50*a* and brass and aluminum are used as a material of the temperature compensation connection port 51*a* in an example of an actual design are summarized in Table 5.

TABLE 5

Unit: mm

| Variable | Range | Representative value (zirconia/brass) | Representative value (zirconia/aluminum) |
|---|---|---|---|
| T1 | 4.0~11.0 | 7.6 | 808 |
| T2 | 1.0~5.3 | 5.2 | 5.2 |
| T3 | 0.5~6.5 | 4.2 | 3.0 |
| T4 | 1.0~5.0 | 3.0 | 3.0 |
| T5 | 1.25 | 1.25 | 1.25 |
| T6 | 0.125~1.1 | 0.5 | 0.5 |
| T7 | 0.125~0.25 | 0.125 | 0.125 |
| T8 | 0.3~1.0 | 0.9 | 0.9 |
| T9 | 0.2~0.6 | 0.3 | 0.3 |
| T10 | 0.9~3.0 | 2.0 | 2.0 |
| T11 | 0.9~3.0 | 1.0 | 1.0 |

Meanwhile, in another embodiment of the structure shown in FIG. 8, a range of values of the structure design variables T1 to T12 shown in FIG. 8B permitted in the case where an optical fiber Bragg grating is inserted into an optical fiber connector ferrule 50*a* of a commercial SC type having a length of 10.5 mm and a diameter of 2.5 mm, and representative values T1 to T12 of structure variables used in the case where zirconia is used as a material of the ferrule 50*a* and brass and aluminum are used as a material of the temperature compensation connection port 51*a* in an example of an actual design are summarized in Table 6.

TABLE 6

Unit: mm

| Variable | Range | Representative value (zirconia/brass) | Representative value (zirconia/aluminum) |
|---|---|---|---|
| T1 | 6.0~15.0 | 7.5 | 8.5 |
| T2 | 1.0~6.0 | 5.1 | 5.1 |
| T3 | 0.5~1.0 | 8.5 | 7.5 |
| T4 | 1.0~5.0 | 3.0 | 3.0 |
| T5 | 2.5 | 2.50 | 2.50 |
| T6 | 0.125~2.3 | 0.5 | 0.5 |
| T7 | 0.125~0.25 | 0.125 | 0.125 |
| T8 | 0.3~0.9 | 0.9 | 0.9 |
| T9 | 0.2~0.6 | 0.3 | 0.3 |
| T10 | 0.9~3.0 | 2.0 | 2.0 |
| T11 | 0.9~3.0 | 1.0 | 1.0 |

In addition, in order to accomplish the object of the present invention, when a connector is assembled using commercial optical fiber connector accessories (plastic tubing, plastic plug frames, springs and stoppers), a range of values of the design variables T4 and T10 of Tables 5 and 6 should be determined on condition that structural interference does not exist among internal structural components.

The temperature compensation structure of FIG. 8 proposed in the present invention and a range of values of the design variables T1 to T12 arranged in Tables 5 and 6 can be modified in a variety of forms and structures.

FIGS. 9 to 12 are cross-sectional views showing optical fiber connectors according to various embodiments of the present invention.

Figure 9:
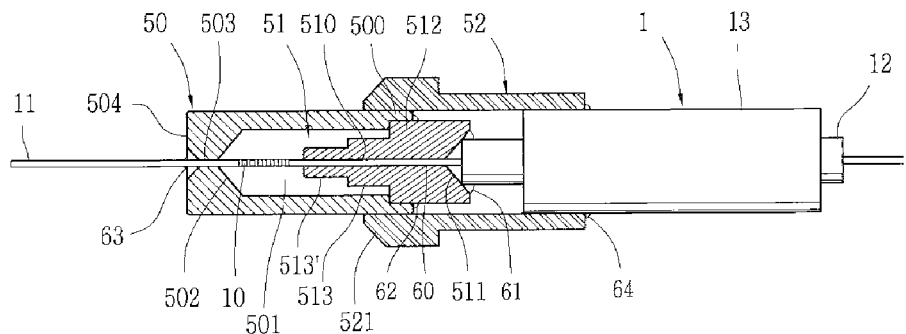
FIGS. 9 to 12 are cross-sectional views showing optical fiber connectors according to various embodiments of the present invention.

FIG. 9 is a view showing an example of forming an optical fiber support unit 513' protruded while having a step from the optical fiber support unit 513 in the structures shown in FIGS. 5 to 7.

Figure 10:
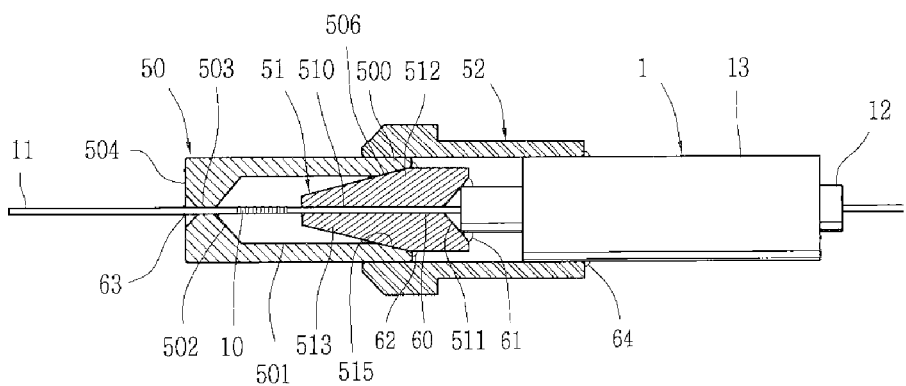

FIG. 10 is a view showing an example of forming an inclined surface 506 at the reception unit 500 of the ferrule 50 and forming a cone-shaped inclined surface 515 at the connection unit 512 of the temperature compensation connection port 51 so that the inclined surface 506 of the ferrule 50 and the inclined surface 515 of the temperature compensation connection port 51 are contacted with and fixed to each other, in the structures shown in FIGS. 5 to 7.

Figure 11:
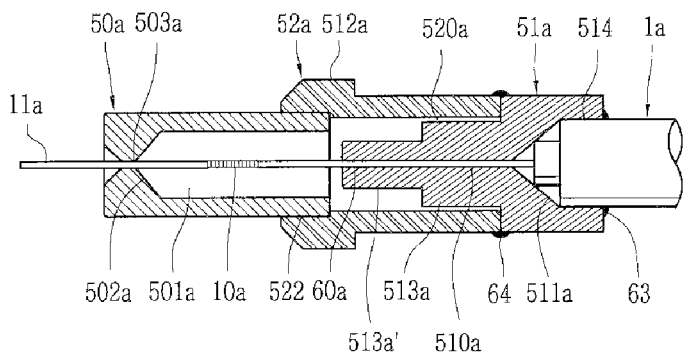

FIG. 11 is a view showing an example of forming an optical fiber support unit 513*a*' protruded while having a step from the optical fiber support unit 513*a* in the structure shown in FIG. 8.

Figure 12:
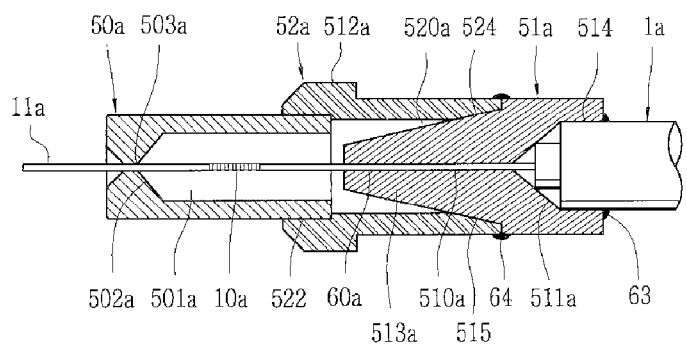

FIG. 12 is a view showing an example of forming an inclined surface 524 at the inlet of the insertion hole 520*a* of the socket 52*a* and forming a cone-shaped inclined surface 515 at the connection unit 512 of the temperature compensation connection port 51*a* so that the inclined surface 524 of the ferrule 50*a* and the inclined surface 515 of the temperature compensation connection port 51*a* are contacted with and fixed to each other, in the structure shown in FIG. 8.

In the embodiments shown in FIGS. 9 to 12, a variety of representative values can be derived under on condition that the range of values of the design variables proposed in Tables 3 to 6 are satisfied.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. An optical fiber connector embedded with an optical Bragg grating for compensating shift in a reflection center wavelength of the optical Bragg grating, the optical fiber connector comprising:
   a ferrule formed with a reception unit at an end of the ferrule for inserting and fixing a temperature compensation connection port from one end, a space unit extended from the reception unit toward inside, and an optical fiber insertion hole penetrating a side surface of the other end along a center of an axial direction from a cone-shaped inclined surface provided at other end of the ferrule opposite to the reception unit so that a corresponding end portion of the space unit gets gradually narrowed toward inside of the space unit so as to guide and insert through optical fiber insertion hole the optical fiber;
   the temperature compensation connection port formed with a connection unit contacting with the reception unit of the ferrule, an optical fiber support unit having an outer diameter smaller than an inner diameter of the space unit of the ferrule from the connection unit so that a gap is provided between the ferrule and the optical fiber support unit and the optical fiber support unit is enclosed entirely by the ferrule and the connection unit and protruding to be spaced apart from an inlet of the ferrule by a predetermined distance to form a space for accommodating the Bragg grating and support an optical fiber, and an optical fiber insertion hole penetrating both ends of the temperature compensation connection port along the center of the axial direction to insert the optical fiber; and an optical fiber cable having the optical fiber inserted into the optical fiber insertion hole of the temperature compensation connection port and the optical fiber insertion hole of the ferrule and the Bragg grating placed in the space unit of the ferrule.

2. The connector according to claim 1, further comprising: a socket, one end of which is fixed to the ferrule so as to enclose an end portion of the ferrule, and the other end of which is fixed to an optical fiber cladding of the optical fiber cable.

3. The connector according to claim 1, wherein a segment of the optical fiber without the Bragg grating is inserted into the optical fiber insertion hole of the temperature compensation connection port and the optical fiber insertion hole of the ferrule and fixed by thermosetting resin, and a segment of the optical fiber inscribed with the Bragg grating is placed in the space unit of the ferrule without being interfered by the temperature compensation connection port and the ferrule.

4. The connector according to claim 1, wherein the reception unit and the space unit of the ferrule are formed to have an inner periphery of a same diameter.

5. The connector according to claim 1, wherein the reception unit of the ferrule is formed to have an inner periphery of a diameter larger than a diameter of the space unit of the ferrule to accommodate the connection unit of the temperature compensation connection port.

6. The connector according to claim 1, wherein the reception unit of the ferrule forms a space having an inclined surface gradually narrowed from the inlet toward inside, and the connection unit of the temperature compensation connection port forms an inclined surface contacting with the inclined surface of the reception unit which forms the space gradually narrowed toward the inside.

7. An optical fiber connector embedded with an optical Bragg grating for compensating shift in a reflection center wavelength of the optical Bragg grating, the optical fiber connector comprising:

a ferrule formed with a space unit for inserting an optical fiber from one end and an optical fiber insertion hole penetrating a side surface of the other end along a center of an axial direction from a cone-shaped inclined surface provided at other end of the ferrule opposite to the reception unit so that a corresponding end portion of the space unit gets gradually narrowed toward inside of the space unit so as to guide and insert through optical fiber insertion hole the optical fiber;

a socket one end of which is fixed to the ferrule so as to enclose an end portion of the ferrule;

a temperature compensation connection port formed with an optical fiber support unit having an outer diameter smaller than an inner diameter of an insertion hole formed in the socket so that a gap is provided between the ferrule and the optical fiber support unit and the optical fiber support unit is enclosed entirely by the ferrule and the socket and protruding to be spaced apart from an inlet of the ferrule by a predetermined distance to form a space for accommodating the Bragg grating, and an optical fiber insertion hole penetrating both ends along the center of the axial direction to insert the optical fiber; and an optical fiber cable having the optical fiber inserted into the optical fiber insertion hole of the temperature compensation connection port and the optical fiber insertion hole of the ferrule and the Bragg grating placed in the space unit of the ferrule.

8. The connector according to claim 7, wherein the outer diameter of the optical fiber support unit of the temperature compensation connection port is formed to have a cross section inclined to be gradually narrowed from the connection unit.

9. The connector according to claim 7, wherein the optical fiber support unit of the temperature compensation connection port is formed to have at least two or more steps.

10. The connector according to claim 7, wherein a segment of the optical fiber without the Bragg grating is inserted into the optical fiber insertion hole of the temperature compensation connection port and the optical fiber insertion hole of the ferrule and fixed by thermosetting resin, and a segment of the optical fiber inscribed with the Bragg grating is placed in the space unit of the ferrule without being interfered by the temperature compensation connection port and the ferrule.

11. The connector according to claim 7, wherein the reception unit and the space unit of the ferrule are formed to have an inner periphery of a same diameter.

12. The connector according to claim 7, wherein the reception unit of the ferrule is formed to have an inner periphery of a diameter larger than a diameter of the space unit of the ferrule to accommodate the connection unit of the temperature compensation connection port.

13. The connector according to claim 7, wherein the reception unit of the ferrule forms a space having an inclined surface gradually narrowed from the inlet toward inside, and the connection unit of the temperature compensation connection port forms an inclined surface contacting with the inclined surface of the reception unit which forms the space gradually narrowed toward the inside.

* * * * *